Nov. 12, 1935.　　　F. H. HALL　　　2,020,465
HYDRAULIC BRAKE APPARATUS
Filed Aug. 5, 1931
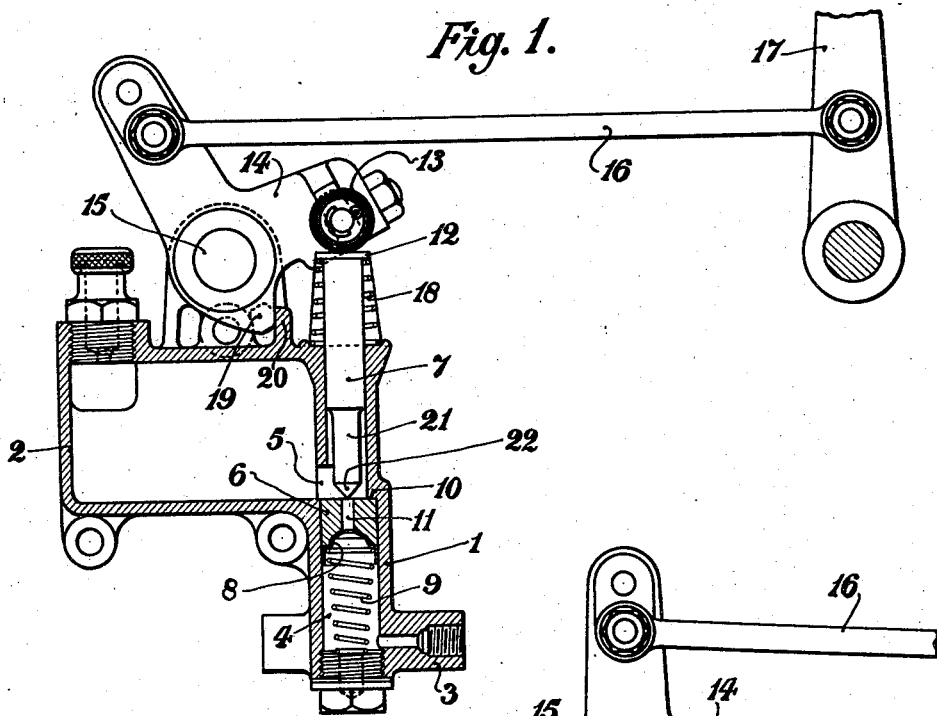
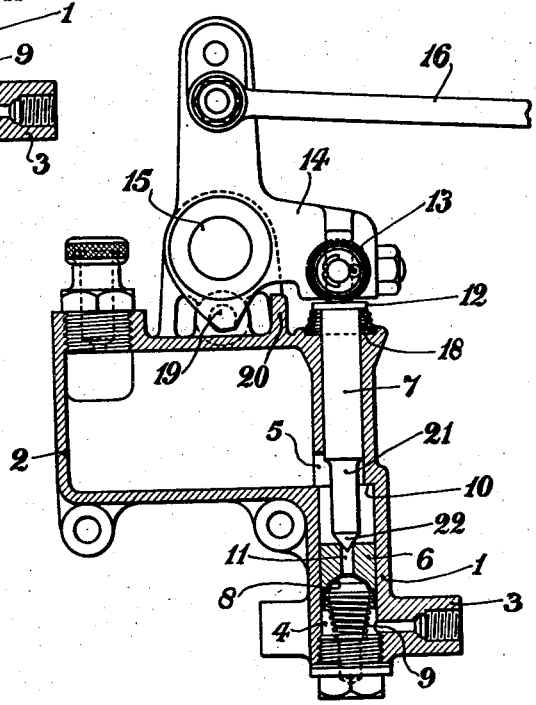
INVENTOR
FREDERICK H. HALL
BY
ATTORNEYS Patented Nov. 12, 1935

2,020,465

UNITED STATES PATENT OFFICE 2,020,465

HYDRAULIC BRAKE APPARATUS

Frederick Harold Hall, Holford, England, assignor of eleven-twentieths to John Hill and one-fortieth to Harry Legassicke Fritche, both of Reading, England Application August 5, 1931, Serial No. 555,221
In Great Britain August 9, 1930

6 Claims. (Cl. 60—54.6)

This invention relates to hydraulic brake systems, for motor-cars and other vehicles, of the kind in which a master cylinder, supplied with fluid from a reservoir contains a piston or plunger device adapted to be operated from a brake lever or pedal in order to force the fluid from the cylinder through a suitable pipe line to cylinders containing pistons that operate the brake shoes.

The object of the present invention is to provide improved, simplified and more reliable means for automatically replenishing the master cylinder with fluid should, for any reason (such as leakage or wear of the brake shoes), there be an insufficient volume of fluid in the working system for the proper operation of the brakes.

According to the invention, the plunger device in the master cylinder comprises two separate parts, namely, a free or floating piston or head portion having an aperture or passage therethrough and an outer or main portion, the said outer or main portion closing the aperture or passage in the piston or head portion during the working stroke, the two parts then moving together, whereas during the return stroke the two parts separate and the aperture is opened, so that fluid from the reservoir can flow through the aperture in the piston head portion into the working space of the master cylinder, so as always to maintain the latter full at the end of the return stroke. The separation of the two parts may be effected by a stop which arrests the return movement of the piston or head portion before the main part has completed its return movement. The two parts of the plunger may be controlled by separate return springs.

Figure 1 of the accompanying drawing represents a vertical section through a master cylinder and reservoir unit showing the improved plunger combination in accordance with the present invention. This view shows the plunger in its fully raised position.

Figure 2 is a similar view showing the plunger during its working stroke when the pedal has been operated.

Referring to the said drawing, the master cylinder I may be cast upon the outside of the main oil reservoir 2, as shown, or it may be disposed within the interior thereof. Conveniently the cylinder I is arranged vertically the lower closed end having a lateral outlet 3 to which the pipe line leading to the brake cylinder is connected. The said cylinder may extend from the top of the oil reservoir to a point below the bottom of the said reservoir, as shown, so that the working space 4 of the cylinder is entirely below the reservoir. This working space is of larger diameter than the upper part of the cylinder. From the reservoir 2, at or near the bottom, a lateral passage or aperture 5 leads through the wall of the cylinder into the interior of the cylinder I.

The plunger in the master cylinder comprises two separate parts, namely, a floating piston head 6 working within the larger lower part or working space 4 of the cylinder and an outer main plunger member 7 working within the upper part of the cylinder. The floating piston head 6 carries a copper cup washer 8 upon its underside and is supported upon a return spring 9 located within the said lower or working space 4 of the cylinder, the said spring being adapted to raise the piston head until the latter is arrested by engaging a stop shoulder 10 at the junction of the upper and lower parts of the cylinder. The said piston head 6 is provided with a central aperture or passage 11.

The outer or main member 7 of the plunger extends above the top of the cylinder I for suitable operation by the brake lever or pedal. Thus, as shown, the upper end of the plunger has a head or flange 12 engaged by a roller 13 on a bell-crank lever 14 pivoted at 15 on the top of the reservoir 2 and connected by a rod 16 to the pedal 17, so that when the pedal is operated the plunger member 7 will be depressed. A spring 18 is disposed between the head 12 and the top of the cylinder I so as to raise the plunger member 7 until a lug 19 on the lever 14 engages a stop 20, the said plunger member 7 then taking the position shown in Figure 1.

The lower end of the said main plunger member 7 carries a depending valve shank 21 terminating in a conical valve 22 adapted, as hereinafter described, to engage the seating formed by the upper edge of the passage 11 in the piston head 6 and close the said passage, but the disposition of the stops, 10, 20, and the length of member 7 are such that when both the said member 7 and the piston head are fully raised against their respective stops as in Figure 1, they are separated by a space or clearance, the valve on the main member being raised from its seating and opening the passage 11 in the piston head; and as the passage 5, leading from the reservoir is open the reservoir is in communication with the working space 4 of the cylinder.

The operation of the device is as follows:—
When the brakes are "off" the two parts 6, 7, of the plunger are in their fully raised positions, as in Figure 1, the floating piston head 6 being maintained by its spring 9 in engagement with the stop 10, and the main upper member 7 being maintained by its spring 18, in the position shown by reason of the lug 19, engaging the stop 20, so that the valve 22 is raised from the aperture 11 in the piston head 6 and oil can thus flow, if necessary, from the reservoir 2, through the passage 5 in the cylinder wall, into the space between the main plunger and the piston head, and through the passage 11 in the latter to the working space 4 of the cylinder below the said piston head, thus ensuring the said working space being filled with oil and the system obtaining its proper supply for the proper operation of the brakes.

When the pressure is applied to the brake pedal 17, the main plunger member 7 is depressed and its valve 22 closes the passage 11 through the piston head 6. Further movement of the said member 7 causes the main member and the piston head to move together, as shown in Figure 2, the said piston head 6 being depressed in the working space 4 of the cylinder, against its spring 9, in order to force fluid therefrom through the pipe line to the brake cylinders. On pressure upon the brake pedal being relieved, the piston head 6 and the main plunger member 7 are raised together by their respective return springs until the piston head is arrested by its stop 10, when the main plunger 7 continues to rise and separates from the piston head, as in Figure 1, its valve 22 opening the passage 11 through the latter. If the working space of the cylinder requires extra oil to fill the same, due to leakage or wear of the brake shoes, such oil is automatically supplied by flowing from the reservoir into the space between the main plunger and the piston head, and through the opened passage 11 in the latter.

Any air contained within the fluid in the working space 4 of the master cylinder can rise through the passage 11, when opened, and through the aperture 5 into the reservoir 2 and out at the top.

Having fully described my invention, what I desire to claim and secure by Letters Patent is:—

1. Hydraulic brake apparatus comprising a vertically disposed master cylinder having at its lower end an outlet adapted to be connected to a pipe line and through which fluid from said pipe line can return to the cylinder, a fluid reservoir communicating with the upper end of said cylinder and from which fluid can flow by gravity into said cylinder, a two-part plunger in said cylinder consisting of a lower free piston member the upper side of which is in constant free communication with the reservoir and having a longitudinal passage through it and an upper relatively-displaceable member separate from but associated with said lower member, a return spring tending to raise the lower piston member, means for depressing the upper member, and means for raising said upper member independently of the lower member, the said upper member when depressed engaging and depressing the lower member and closing the passage in it to cause fluid to be discharged from the cylinder, and the two members of the plunger separating on the upstroke so that the passage in the lower member is opened and the cylinder space below said lower member thereby placed in free and unrestricted communication with the reservoir to enable fluid to flow from the reservoir into said cylinder space and to enable air trapped in the fluid to escape freely from said cylinder space through the passage and into the reservoir.

2. Hydraulic brake apparatus comprising a vertically disposed master cylinder having at its lower end an outlet adapted to be connected to a pipe line and through which fluid from said pipe can return to the cylinder, a fluid reservoir communicating with the upper end of said cylinder and from which fluid can flow by gravity into said cylinder, and a master plunger in the cylinder comprising a pair of associated members one of which has an unrestricted passage therethrough, means to urge said members apart on the up-stroke and when they have returned to their uppermost position to allow unrestricted communication, through the passage, between the reservoir and the lower part of the cylinder and to provide a free passage for fluid to pass from the cylinder to the reservoir, said members being displaced relatively towards one another to close such communication upon operation of the master plunger.

3. Hydraulic brake apparatus comprising a vertically disposed master cylinder having at its lower end an outlet adapted to be connected to a pipe line and through which fluid from said pipe line can return to the cylinder, a two-part plunger in said cylinder consisting of a lower free piston member having an unrestricted passage between top and bottom faces and an upper relatively-displaceable member separate from but associated with said lower member, a return spring tending to raise the lower piston member, means for depressing the upper member, means for raising said upper member to separate said members upon upstroke and when at rest independently of the lower member, and a fluid reservoir in constant free communication with the upper side of the lower piston member and from which fluid can flow by gravity to said upper side of the said piston member, the upper member of the plunger, when depressed, engaging and depressing the lower member and closing the passage in it to cause fluid to be discharged from the cylinder, and the two said members of the plunger separating on the upstroke while fluid is entering the cylinder from the pipe line so that the passage in the lower member is opened and fluid thereby allowed to flow from the upper side of the lower member through the passage into the cylinder space below said lower member, while fluid in said space is allowed to escape freely through the passage into the reservoir.

4. Hydraulic brake apparatus comprising a vertically disposed master cylinder having at its lower end an outlet adapted to be connected to a pipe line and through which fluid from said pipe line can return to the cylinder, a free piston member in the cylinder and having an unrestricted longitudinal passage therethrough, a spring in the cylinder adapted to raise said piston member, a stop at the upper part of the cylinder for limiting the upward movement of said piston member, a fluid reservoir situated above the stop and in constant communication with the upper face of the free piston member, an upper plunger member immediately above and associated with but separate from the free piston member and displaceable relatively thereto in a vertical direction, external actuating means for depressing said upper plunger member, and a spring acting to raise said upper plunger member and to urge it away from the free piston member to cause it to separate therefrom during the upstroke and when at rest, the said upper plunger member having a longer permissible range of travel than the free piston member and its lower end engaging said piston member when depressed so as to depress the same and also close the passage therein, while on the upstroke the stop and the spring acting on the upper plunger member ensure the separation of the said plunger member from the free piston member and the consequent opening of the passage through the latter member so as to place the cylinder space below the free piston member in direct and unrestricted communication with the reservoir, thereby permitting replenishing of the cylinder and also the escape of fluid from said cylinder through the free piston member into the reservoir.

5. Hydraulic brake apparatus comprising a vertically disposed master cylinder having in its lower part a fluid containing working space and an outlet at the lower end of said working space, said outlet being adapted to be connected to a pipe line and through which fluid from said pipe line can return into the cylinder, a free piston member in said working space and having a longitudinal passage therethrough, a spring within the cylinder adapted to raise said piston member, a stop for limiting the upward movement of said piston member, a fluid reservoir situated above the working space and in constant free communication with the upper side of the piston member, a vertically movable plunger member above the piston member, being separate from and independent of the said piston member and extending above the upper end of the master cylinder, a member external to the cylinder and operable upon said plunger member to depress the same into engagement with the piston member, a spring acting to raise the plunger member in order to allow said piston member to be independently raised by its own spring and in order to lift the said plunger member clear of the piston member after the latter has been arrested by its stop, and valve means on the lower extremity of the plunger member for engaging and closing the upper end of the passage in the piston member and thereby isolate the working space from the reservoir and depress the said piston member by its impingement thereon when said plunger member is depressed, the piston and plunger members returning upwardly when the external member is inoperable upon the plunger member and while fluid is entering the cylinder from the pipe line, the piston member engaging its stop and the plunger member, which has a longer permissible stroke than the piston member, separating from said piston member under the influence of its spring so as to open the passage in said piston member and thereby allow fluid to pass from the reservoir to the cylinder and air trapped in the fluid from the cylinder to rise into the reservoir.

6. Hydraulic brake apparatus comprising a vertically disposed master cylinder having in its lower part a fluid containing working space and an outlet at the lower end of said working space, said outlet being adapted to be connected to a pipe line and through which fluid from said pipe line can return into the cylinder, a free piston member in said working space and having a longitudinal passage therethrough, a spring within the cylinder adapted to raise said piston member, a stop for limiting the upward movement of said piston member, a fluid reservoir integral with the upper part of the cylinder and situated above the working space of the cylinder, the lower part of the reservoir having an aperture in its side leading into the upper part of the cylinder at a position immediately above the piston stop and being in constant free communication with the upper side of the piston member, a vertically movable plunger member above the piston member, being separate from and independent of the said piston member and extending above the upper end of the cylinder, a lever mounted upon the top of the reservoir and operable upon said plunger member to depress the same into engagement with the piston member, a spring bearing upon a fixed part and acting to raise the plunger member in order to allow said piston member to be independently raised by its own spring and in order to lift the said plunger member clear of the piston member after the latter has been arrested by its stop, and a cone valve on the lower end of the plunger member for engaging and closing the upper end of the passage in the piston member and thereby isolate the working space from the reservoir and depress the said piston member by its impingement thereon when said plunger member is depressed, the piston and plunger members returning upwardly when the lever is inoperable upon the plunger member and while fluid is entering the cylinder from the pipe line, the piston member engaging its stop and the plunger member, which has a longer permissible stroke than the piston member, separating from said piston member under the influence of its spring so as to provide an unrestricted open passage through said piston member and thereby allow fluid to pass from the reservoir to the cylinder and fluid from the cylinder to rise freely into the reservoir.

FREDERICK HAROLD HALL.